United States Patent [19]
Yuki et al.

[11] Patent Number: 5,093,751
[45] Date of Patent: Mar. 3, 1992

[54] CARRY NOISE MEASURING SYSTEM FOR MAGNETIC RECORDING MEDIUM

[75] Inventors: Hidetsugu Yuki, Odawara; Kiyomi Yamaguchi, Hadano, both of Japan

[73] Assignee: Hitachi Electronics Engineering Co., Ltd., Tokyo, Japan

[21] Appl. No.: 496,594

[22] Filed: Mar. 21, 1990

[51] Int. Cl.⁵ .............................................. G11B 5/02
[52] U.S. Cl. ................................................... 360/25
[58] Field of Search ................... 360/25, 31; 324/210, 324/212

[56] References Cited

U.S. PATENT DOCUMENTS

| | | | |
|---|---|---|---|
| 3,530,384 | 9/1970 | Zussman | 360/31 |
| 3,984,763 | 10/1976 | Koester et al. | 360/31 |
| 4,764,915 | 8/1988 | Efron et al. | 360/25 |
| 5,013,616 | 5/1991 | Morichika | 428/900 |

Primary Examiner—David J. Severin
Attorney, Agent, or Firm—Fay, Sharpe, Beall, Fagan, Minnich & McKee

[57] ABSTRACT

The present invention comprises a variable frequency converter, a band-pass filter having a constant center frequency and a predetermined band-width, an effective value detection circuit and a control signal generator for generating a control signal for varying a conversion frequency of the variable frequency converter. A test signal readout from a magnetic recording medium is frequency-converted by the variable frequency converter and the band-pass filter derives a constant frequency signal from frequencies frequency-converted by the variable frequency-converter to derive a predetermined frequency component of the carry noise. The effective value detector detects effective value of the derived frequency component, in which the control signal generator sequentially changes the frequency converted by the variable frequency converter to sequentially change the predetermined frequency component of the derived carry noise signal to thereby obtain equivalent effective values for respective frequency components in the frequency spectrum of the carry noise signal. With the effective values of the respective frequency components of the carry noise signal obtained in this manner, the detected carry noise energy can be easily calculated and by subtracting the base noise energy therefrom, the original carry noise energy can be obtained.

7 Claims, 4 Drawing Sheets

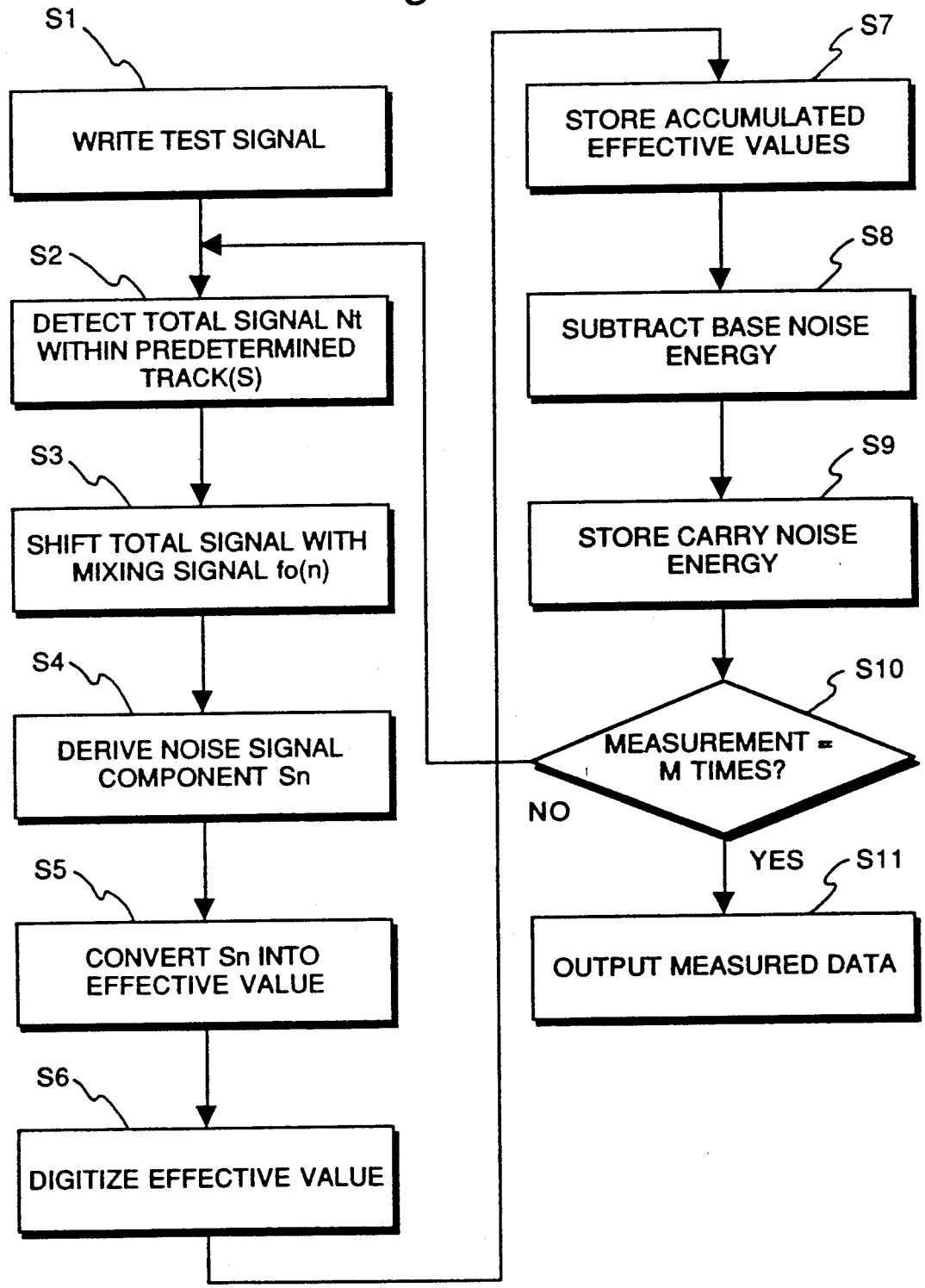

CARRY NOISE MEASURING SYSTEM FOR MAGNETIC RECORDING MEDIUM

BACKGROUND OF THE INVENTION

The present invention relates to a carry noise measuring system for magnetic recording medium and, particularly, to such system for a thin-film magnetic disk in which medium noise, the so-called carry noise, due to a magnetic recording medium in the form of thin-film magnetic disk is discriminated from noise produced in a noise measuring device itself so that carry noise can be measured within a short time.

The magnetic disk is widely used as one of recording media for an external memory device of an electronic computer. Such magnetic disk is checked during its fabrication on noise thereof and on electric recording performance thereof.

The so-called thin-film magnetic disk whose magnetic layer is formed by sputtering or plating, etc., has been used concomitantly to the recent demand of increased memory capacity and memory density of the magnetic disk. It has been known that, in such recording medium, carry noise is produced by the disk itself. Since carry noise affects the memory performance thereof, this noise should be measured.

A carry noise measuring device itself produces noise at a magnetic head and an amplifier of a readout signal system thereof. This noise is inherent to the measuring device itself and referred to as base noise. In measuring carry noise, base noise should be excluded. FIGS. 1a, 1b and 1c show frequency distribution and energy of these noises and a measuring principle for measuring these noises.

The carry noise measurement of the magnetic disk is performed by recording a test or carry signal in the magnetic disk and reproducing it. FIG. 1a shows a total noise spectrum obtained when the test signal is reproduced. The total noise spectrum is composed of a base noise spectrum Nb, a carry noise spectrum Nc overlapped thereon and test signal components overlapped thereon. As shown in FIG. 1a, the test signal includes, in addition to its basic frequency. "1st", high harmonics "2nd", "3rd", etc.

A base noise signal appears in a magnetic head and an amplifier system of the measuring device when there is no input signal to the head. Therefore, its energy can be obtained by measuring effective amplitude values or levels at respective frequencies and integrating or accumulating them.

Carry noise is generated when the test signal is recorded, over a wide frequency range, say, from 0.1 MHz to 10 MHz. A carry noise energy is obtained by integrating effective amplitude values or levels at respective frequencies within the range similarly to the case of base noise signal. In the past, this was done by means of a spectrum analyzer such that the total signal is subtracted by the test signal including the high harmonics at respective frequencies to obtain effective values thereof and an area defined by the frequency spectrum Nc of the carry noise signal over a predetermined frequency range, e.g., from about 0.1 MHz to about 10 MHz, is calculated by integrating the effective values, as energy of the detected carry noise.

In such method of integrating effective values obtained by the spectrum analyzer, it is possible to measure carry noise of a disk with relatively high accuracy. However, it takes long time and, therefore, it is not adequate to use such method in a practical test procedure of disk.

SUMMARY OF THE INVENTION

An object of the present invention is to provide a carry noise measuring system for thin-film magnetic disk by which time necessary to measure carry noise thereof can be shortened.

Another object of the present invention is to provide a carry noise measuring system for a thin-film magnetic disk, by which a carry noise measurement can be done within a short time.

A further object of the present invention is to provide a carry noise measuring system for a thin-film magnetic disk by which carry noise can be measured efficiently during a test procedure at an end of its manufacturing process.

According to the present invention, the above objects can be achieved by a provision of a carry noise measuring system for a magnetic recording medium, which comprises a variable frequency converter, a band-pass filter having a fixed center frequency and a predetermined pass band, an effective value detector and a control signal generator for generating a control signal for changing frequency conversion rate of the variable frequency converter for frequency converting a carry noise signal readout from a magnetic recording medium, wherein a certain fixed frequency signal is derived from the frequency-converted signal by the band-pass filter to derive carry noise components having predetermined frequencies, effective values of these components are detected by the effective value detector and wherein the frequency converted by the variable frequency converter is changed sequentially by the control signal generator to sequentially change the predetermined frequency component of the derived carry noise signal to thereby obtain effective values at respective frequency in a frequency spectrum of carry noise signal, equivalently.

With the effective values of the respective frequency components of the carry noise signal obtained in this manner, the detected carry noise energy can be easily calculated and, by subtracting the base noise energy therefrom, the carry noise energy can be obtained.

Since an output frequency of the variable frequency converter is changed sequentially by the control signal, predetermined frequency components of the carry noise derived by the band-pass filter are sequentially obtained. An amount of frequency shift or increment given by the control signal should be selected such that an envelope of frequency spectrum of the carry noise signal can be reproduced by the frequency components derived from the band-pass filter.

With this scheme, it is possible to measure the carry noise without using spectrum analyzer.

BRIEF DESCRIPTION OF THE DRAWINGS

FIG. 3b is a flowchart showing an operation of the carry noise detecting device shown in FIG. 3a.

DETAILED DESCRIPTION OF THE PREFERRED EMBODIMENT

Figure 1A:
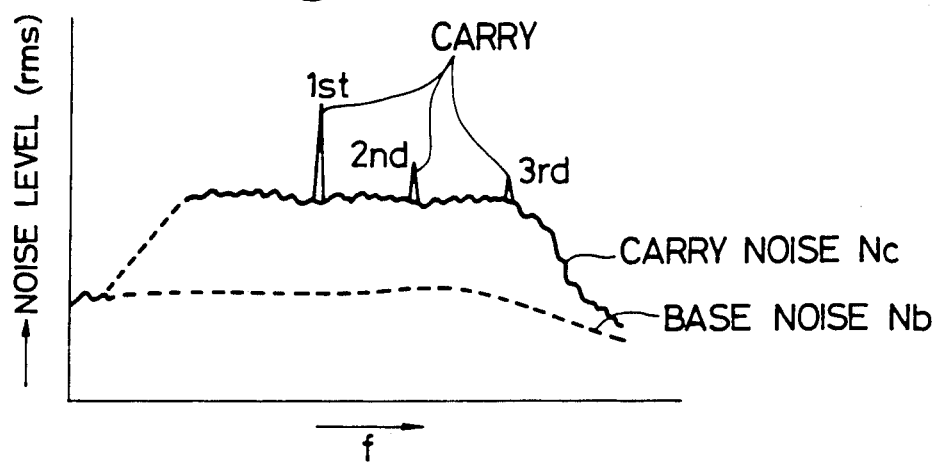
FIGS. 1a to 1c illustrate a principle of carry noise measurement.
Figure 1B:
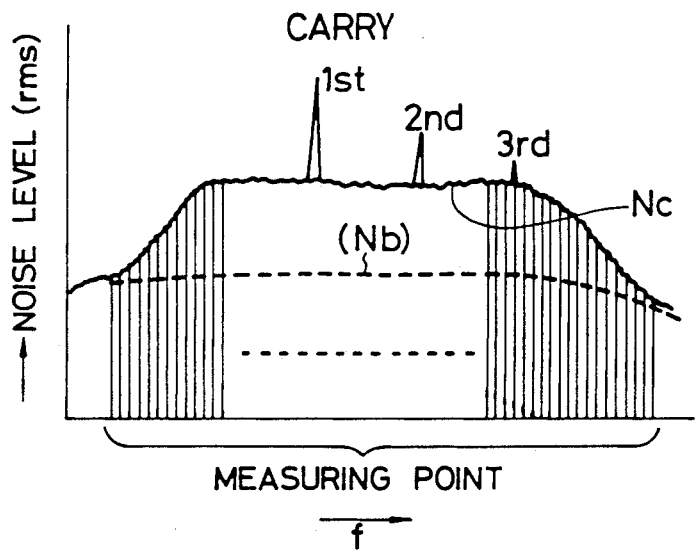
Figure 2A:
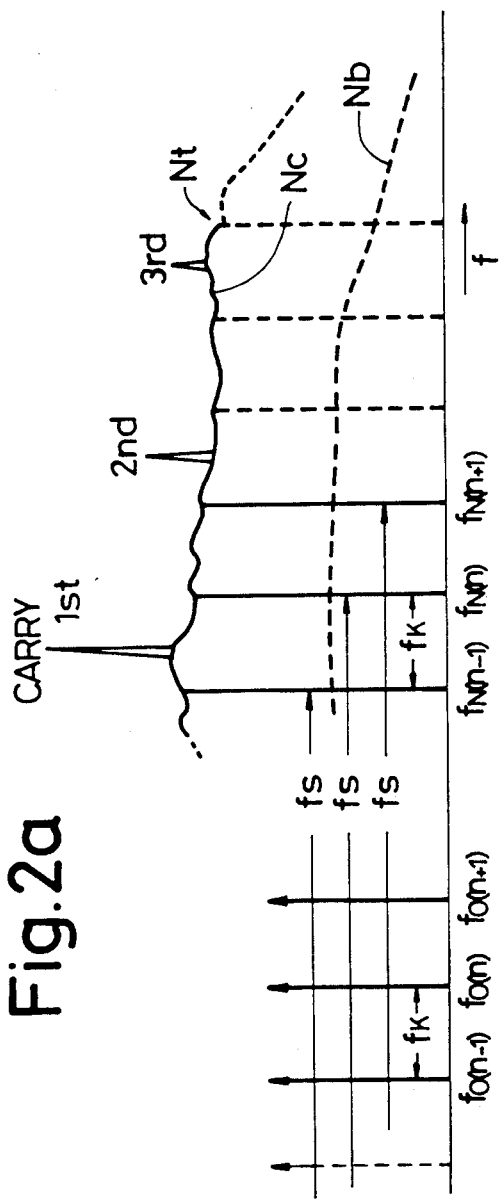
FIGS. 2a and 2b illustrate a signal processing in the carry noise measurement according to the present invention.

FIG. 2a shows a frequency spectrum of the total signal Nt obtained when a test signal recorded in a certain track of a thin-film magnetic disk is readout. The total signal frequency spectrum includes a frequency spectrum Nc of carry noise signal and frequency spectrum Nb of base noise, as in FIG. 1a, as well as a basic frequency component "1st" and high harmonics "2nd", "3rd", etc., of the test signal.

Figure 2B:
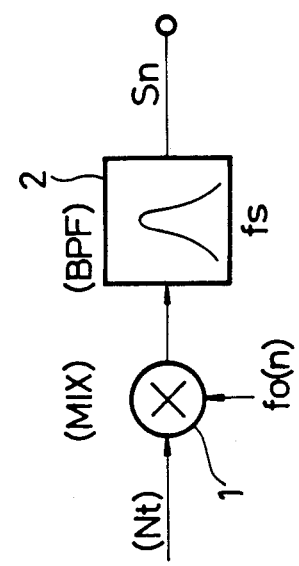

The total signal Nt is mixed in a mixer 1 with a signal of frequency f0(n) to obtain a signal having frequency of ft±f0(n) as shown in FIG. 2b, where ft depicts frequency of the total signal Nt. Then, for ft−f0(n), for example, a desired frequency component of the total signal Nt, which has a center frequency fs, is derived therefrom by means of a narrow band-pass filter 2 having a center frequency fs. The derived signal is a noise component signal Sn of the carry noise signal.

When frequency f0(n) of the mixing signal supplied to the mixer 1 is changed successively from f0(n−1) through f0(n) to f0(n+1) with an increment of fk, the frequency spectrum Nc of the carry noise signal changes in frequency from $f_N(n-1)$ through $f_N(n)$ to $f_N(n+1)$, respectively, as shown in FIG. 2a. That is, when the mixing signal frequency f0(n) is changed in this manner, the noise component signal Sn having center frequency fs includes signal components having main frequencies are fN(n−1), fN(n) and fN(n+1) as shown in FIG. 2a.

Frequency of the mixing signal supplied to the mixer 1 is changed in a predetermined measuring range which may be from 0.1 MHz to 10 MHz, for example. In such case, frequency of the noise component signal Sn may be shifted by fs which is center frequency of the band-pass filter 2. However, the range of frequency shift is substantially within the range from 0.1 MHz to 10 MHz. If carry noise having frequency in this range is obtained from the thin-film magnetic disk, it can be considered that carry noise signal is obtained in substantially all frequency range.

With the frequency change of the mixing signal with the increment fk (=f0(i)−f0(i−1), where i is an integer), the noise component signal frequency is changed with an increment fk. By selecting fk such that the frequency components of the noise component signal Sn do not overlap with the base frequency "1st" of the test signal and high harmonics thereof, the base frequency and high harmonics of the noise component signal Sn are removed and thus only noise component of the frequency spectrum Nc of the carry noise signal can be derived. FIG. 2a illustrates this selection of frequency components fN(n−1), fN(n) and fN(n+1) from frequency spectrum Nc of the carry noise signal.

Further, frequency shift fk should be small enough for reproduction of an envelope of spectrum over a measuring range. Since configulation of noise is substantially constant, 10 to 20 sampling points in the range may be enough, practically.

Figure 1C:
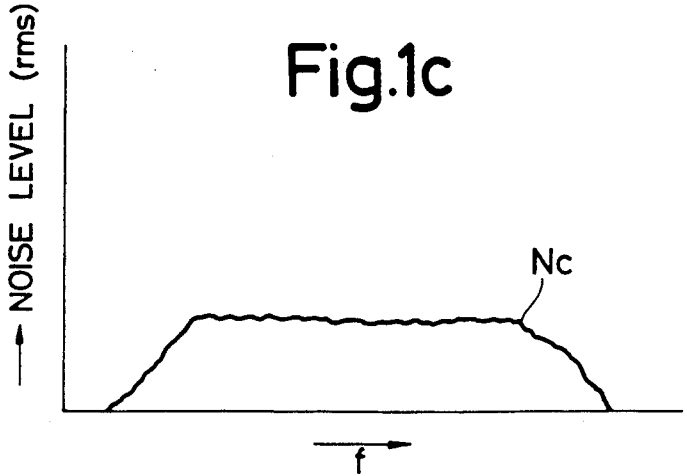

When sampling is to be performed at 20 points correspondingly to respective frequencies f0(1) to f0(20), the mixing signal f0(n) is changed from f0(1) to f0(20) sequentially by a control circuit such as a microprocessor (MPU) to obtain effective values of respective noise signal components Sn of frequency fs at the respective mixing signal frequencies. Then these effective values are integrated by the MPU to obtain an area (energy of the detected carry noise) defined by frequency spectrum of the detected carry noise signal including the base noise energy. Since the base noise energy can be calculated as mentioned previously, the detected carry noise energy is subtracted by the base noise energy, resulting in a real carry noise energy (corresponding to the frequency spectrum Nc in FIG. 1c).

Although the detected carry noise energy is described as being obtained by integration of the effective values of the noise signal components Sn of frequency fs, it may be possible to obtain same by a mere summation of the effective values depending upon sampling manner used and band width of frequency fs derived by the band-pass filter BPS2.

Figure 3A:
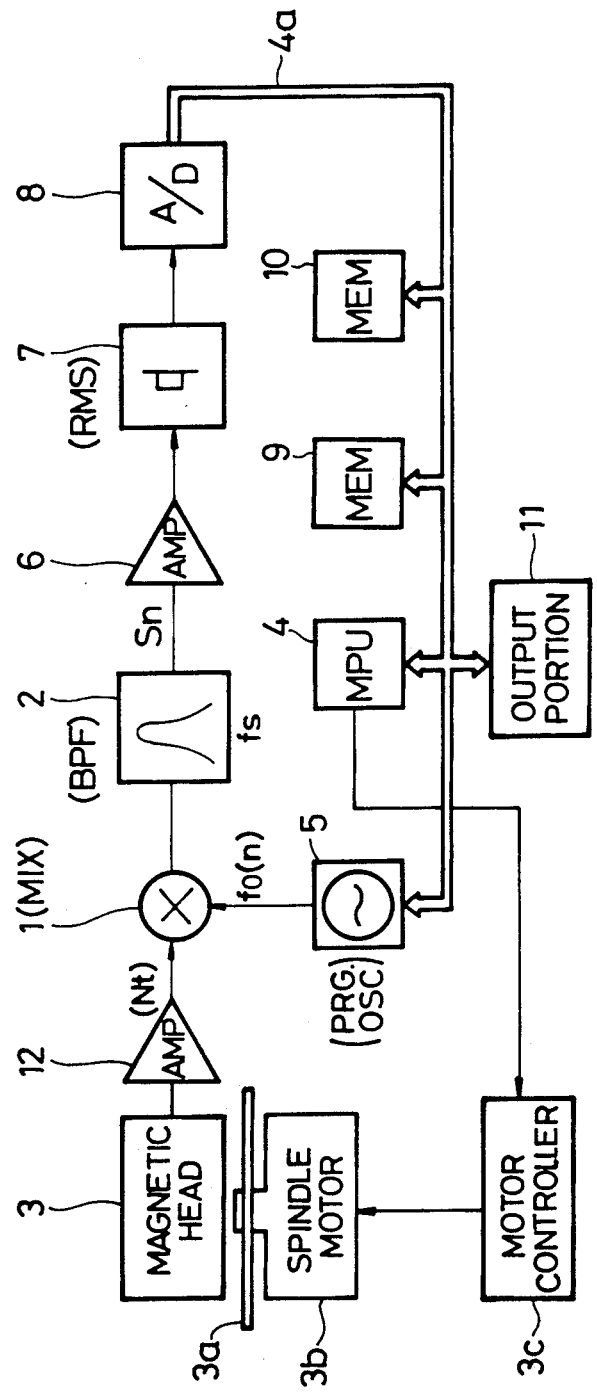
FIG. 3a is a block diagram of a carry noise detecting device for a thin-film magnetic disk, to which the present invention is applied.

FIG. 3a shows a construction of a carry noise detecting device for a thin-film magnetic disk to be used to perform the above described processing. A thin-film magnetic disk 3a to be tested is mounted on a spindle of a spindle motor 3b. The spindle motor 3b is driven by a motor controller 3c controlled by the MPU4.

The mixer 1 receives a mixing signal f0(n) from a programmable frequency oscillator 5. A total signal Nt readout from a magnetic head 3 through an amplifier 12 is mixed with the mixing, signal f0(N) and a resultant signal is frequency-converted. The mixer 1 may be constituted with a multiplier circuit.

The band-pass filter 2 derives, from the frequency-converted and frequency-shifted total signal, the noise signal component Sn having a constant center frequency fs and a predetermined narrow band. The derived signal is amplified by an amplifier 6 and supplied to an effective value detection circuit (RMS)7. An output of the effective value detection circuit 7 is supplied to an A/D converter 8 and outputted to a bus 4a of the MPU 4 as a digital value. The digital effective value on the bus 4a is received by the MPU 4 and stored in the portion 9 of a main memory as a measurement data, under control of the MPU 4.

The effective value is usually detected at each of a plurality of points sequentially for each track (or several tracks) of the magnetic disk 3a and, as a practical measurement data, a mean value is calculated and stored in a predetermined region of the memory portion 9 correspondingly to the frequency f0(i) of the mixing signal. The detection of effective values at these points in 1 track or tracks can be done by sampling the output of the effective value detection circuit 7 by the A/D converter circuit 8 at a suitable timing. The number of measuring points necessary can be determined by selecting the sampling frequency of the A/D converter 8 correspondingly to rotation number of the magnetic disk 3a. The MPU 4 sets a predetermined control value (digital value) in the oscillator 5 such that the frequency of the mixing signal becomes f0(1), and provides an effective value (mean effective value) of the noise signal component Sn for a selected track (or tracks) of the magnetic disk 3a.

Then, the MPU 4 sets a new control value in the programmable oscillator 5 such that the frequency f0(i) becomes f0(2) which is shifted from f0(1) by fk and operates in a similar manner to obtain an effective value of next noise signal component Sn. This is repeated until the frequency f0(i) becomes f0(20). The effective values thus obtained are stored in the memory portion 9. The MPU 4 also accumulates or integrates these effective values time to time and stores in the memory portion 9. In this case, it may be possible to accumulate or integrate these values by reading, at a completion of the frequency shift of the mixing signal to f0(20), effective values of the respective frequency components obtained correspondingly to the shift, from the memory portion 9.

FIG. 3b shows the above mentioned processing. Firstly, the MPU 4 sends a predetermined instruction signal to the motor controller 3c to rotate the magnetic disk 3a for writing a test signal (carry signal) in respective tracks by means of the magnetic disk 3 (Step S1). Then, the MPU 4 controls a reading operation of the magnetic head 3 of the test signal within a selected track region (detection of total signal Nt, Step S2). The total signal Nt is frequency-converted in the mixer 1 by the mixing signal f0(n) supplied sequentially by the programmable oscillator 5. The total signal Nt whose frequency is converted sequentially is shifted in frequency by fk (not always constant) (Step S3). The band-pass filter 2 derives a center frequency component fs of a frequency spectrum of the frequency-shifted total signal Nt and detects noise signal components Sn correspondingly to the respective shift frequencies (Step S4).

The noise signal component Sn detected by this circuit is level-regulated suitably by the amplifier 6 and supplied to the effective value detection circuit 7. The effective value detection circuit 7 detects, from the detected noise signal components Sn, effective values thereof and converts them to a mean value (Step S5).

The A/D converter 8 digitizes the respective detected effective values sequentially and supplies them through the bus 4a to the MPU 4 (Step S6). The MPU 4 stores the effective values (mean effective values, practically) in the memory portion 9 while accumulating or integrating these values to obtain an area (energy) of the frequency spectrum of the detected carry noise signal, which is also stored in the memory 9.

The result of accumulation or integration obtained at a time when the mixing signal frequency f0(n) is the final measuring frequency f0(20) is the aimed area which is stored in the memory 9 (Step S7).

Then, the same processing is repeated for the magnetic disk 3a with no signal to the magnetic head 3 to measure the base noise and a resultant base noise energy is calculated by the MPU 4 and stored in another portion 10 of the main memory. The MPU 4 subtracts the area (energy) of the frequency spectrum of the base noise signal from the area (energy) of the detected carry noise signal stored in the memory portion 9 (Step S8) to obtain the area (energy) of the frequency spectrum of the original carry noise signal which is stored in the memory portion 9 (Step S9). Then, the MPU 4 checks the number of measurements (Step S10) when a measurement of 1 track region (including one track or tracks) completes and, when the number is smaller than a predetermined number M, the operation is returned to the Step 2 and shifted to a next tract region for which the same operation is repeated. This is repeated M times. For each measurement, the measured result is stored in a different region of the memory portion 9. After M measurements complete, the MPU 4 picks up energy data of the carry noise stored in the memory portion 9 correspondingly to the respective measurements through an output portion 11 (Step S11).

A control program of the MPU 4 for performing the above described operation may be stored in, for example, the memory portion 10.

In this measurement, the output of the programmable oscillator 5 is constant. Therefore, in measuring the area of frequency spectrum of the base noise signal as well as the detected carry noise signal, the output is added thereto. However, since the frequency spectrum of the detected carry noise signal is subtracted by that of the base noise signal, the effect of the output of the programmable oscillator 5 is removed practically.

In the area measurements of the respective noise signals, it is easy to remove the effect of the output of the oscillator 5. That is, it is removed by regulating the output level of the carry noise signal Nt by means of the amplifier 12. Alternatively, it is possible to regulate it such that a result of mixing with the output of the oscillator 5 becomes the output level of the carry noise signal Nt. Further, in calculating the area by means of the MPU 4, it is possible to remove the effect of the output of the oscillator 5. In this manner, the measurement of base noise is not always to be done in the same manner as that of the carry noise and it is possible to preliminarily store a result measured by a spectrum analyzer in the memory portion 10.

In the described embodiment, the sequence of operation etc., is a mere example and any other suitable scheme can be used. For example, it is possible to preliminarily remove the test signal (carry) from the total signal Nt under a control of the MPU 4 or by means of another control circuit, frequency-convert a resultant signal sequentially and derive components having constant frequency from a band-pass filter having a constant center frequency and a constant band width.

The medium noise of the magnetic disk depends on position in the disk, for example, position of track. Therefore, it is possible to preliminarily store in a memory position data of a plurality of positions in a typical track region, to position the magnetic head 3 in tracks selected sequentially by the MPU 4 and to perform measurements for the tracks sequentially.

Although in the described embodiment the frequency-conversion is performed by the mixing circuit, the same can be performed by a multiplier circuit or any other frequency-converter circuit so long as it is a variable frequency conversion circuit. As the control circuit for controlling the variable frequency converter, it is not limited to that constituted with the MPU and the memory. Further, the effective value can be obtained by calculation in the MPU based on the signal obtained by directly A/D converting the output of the band-pass filter by the A/D converter, instead of the usage of the effective value detector.

What is claimed is:

1. A carry noise measurement system for a magnetic recording medium in which a test signal of predetermined frequency is written in a magnetic recording to be measured on carry noises and the written test signal is readout therefrom to measure carry noise of the magnetic recording medium on the basis of the readout test signal, the carry noise measurement system comprising a variable frequency converter, a band-pass filter having a constant center frequency and a predetermined bandwidth, an effective value detection circuit and a control signal generator for generating a control signal for varying a conversion frequency of said variable frequency converter, said variable frequency converter being adapted to frequency-convert the test signal readout from said magnetic recording medium, said band-pass filter being adapted to derive frequency components of said carry noise signal from frequencies frequency-converted by said variable frequency-converter, said effective value detection circuit being adapted to detect effective values of the frequency components derived by said band-pass filter, said control signal generator being adapted to generate said control signal for sequentially changing frequency of said carry noise signal converted by said variable frequency converter, an amount of change of frequency converted by said control signal being selected such that an envelope of a frequency spectrum of the carry noise signal can be reproduced by the frequency components sequentially derived from said band-pass filter, the effective values being obtained for respective frequency components of the carry noise signal by sequentially changing the converted frequency of the carry noise signal.

2. A carry noise measurement system for a magnetic recording medium in the form of thin-film in which a test signal of a predetermined frequency is written in a magnetic recording medium to be measured on carry noise and the written test signal is readout therefrom to measure carry noise of the magnetic recording medium on the basis of the readout test signal, the carry noise measurement system comprising a variable frequency signal generator, a frequency converter, a band-pass filter having a constant center frequency and a predetermined band-width and a control circuit, said variable frequency signal generator being responsive to a control signal from said control circuit to change frequency of an output signal thereof, said frequency converter being adapted to frequency-convert the carry noise signal detected from said magnetic recording medium according to the output signal of said variable frequency signal generator, said band-pass filter being adapted to derive frequency components of said carry noise signal from frequencies frequency-converted by said variable frequency-converter, said control circuit being adapted to generate said control signal for sequentially shifting the output frequency of said variable frequency signal generator over a predetermined measuring frequency range, an amount of shift of the output signal frequency by said control signal being selected such that an envelope of a frequency spectrum of the carry noise signal can be reproduced by the predetermined frequency components sequentially derived from said band-pass filter and that the frequency component of the test signal and high harmonic components thereof are not coincident with the center frequency of said band-pass filter, effective values of outputs of said band-pass filter being obtained by sequentially shifting the output signal frequency.

3. A carry noise measurement system for a magnetic recording medium in the form of thin-film in which a test signal of a predetermined frequency is written in the magnetic recording medium to be measured on carry noise and the written test signal is readout therefrom to obtain a first carry noise energy on the basis of the readout test signal subtracted by abase frequency component and high harmonic components of the predetermined frequency and the first carry noise energy is subtracted by a base noise energy generated by a measuring device itself to obtain a second carry noise energy to be measured, the carry noise measurement system comprising a variable frequency signal generator responsive to a control signal to change a frequency of its output signal, a frequency converter responsive to a detected carry noise signal detected from the magnetic recording medium and to the output signal of said variable frequency signal generator to convert frequency of the carry noise signal, a band-pass filter having a constant center frequency and a predetermined bandwidth for deriving frequency components from the carry noise signal and a control circuit for generating the control signal for shifting the frequency component and the high harmonic components of the test signal converted by said frequency converter outside the center frequency of said band-pass filter to thereby sequentially change the frequency of the output signal of said variable frequency generator over a predetermined frequency range, an amount of shift of the output signal frequency by said control signal being selected such that an envelope of a frequency spectrum of the carry noise signal can be reproduced by the predetermined frequency components sequentially derived in response to the sequential conversion of frequency of said output signal by said control signal, effective values of outputs of said band-pass filter being obtained by sequentially shifting the output signal frequency, an area of a frequency spectrum of the carry noise signal being obtained on the basis of the effective values as a measured value of the first carry noise energy upon which the second carry noise energy is obtained.

4. The system claimed in claim 3, wherein said magnetic recording medium comprises a magnetic disk, wherein said sequential frequency shift of said output signal is performed by shifting frequency of said output signal by a predetermined amount and wherein said carry noise energy is measured to obtain the base noise energy when the test signal is not readout from said magnetic disk.

5. The system claimed in claim 4, wherein said control circuit causes the shift of frequency of said output signal by the predetermined amount after a mean value of the effective values of n tracks of said recording medium is obtained where n is a positive integer and wherein said area of the frequency spectrum of said carry noise is calculated by accumulating the effective values obtained according to said conversion.

6. The system claimed in claim 4, wherein said control circuit causes the shift of frequency of said output signal by the predetermined amount after a mean value of the effective values of n tracks of said recording medium is obtained where n is a positive integer and wherein said area of the frequency spectrum of said carry noise is calculated by integrating the effective values obtained according to said conversion.

7. The system claimed in claim 6, further comprising an effective value detection and an A/D converter for A/D converting an output of said effective value detector, wherein said control circuit is constituted with a micro processor and a memory and receives a digital output of said A/D converter, wherein said memory sequentially stores the effective values in response to said shift, wherein said variable frequency signal generator comprises a programmable oscillator responsive to said control signal in digital form to generate an analog signal having a frequency corresponding to a value of said control signal, wherein said band-pass filter is a narrow band-pass filter and provides an output supplied to said effective value detector to provide effective values, wherein said micro processor generates said control signal in digital from to shift frequency of said variable frequency signal generator, whereby the area of the frequency spectrum of said carry noise signal is calculated on the basis of the effective values stored in said memory.

* * * * *